(12) United States Patent
Cao et al.

(10) Patent No.: US 9,057,787 B2
(45) Date of Patent: Jun. 16, 2015

(54) COLORIMETRIC RADIATION DOSIMETRY BASED ON FUNCTIONAL POLYMER AND NANOPARTICLE HYBRID

(71) Applicant: INTERNATIONAL BUSINESS MACHINES CORPORATION, Armonk, NY (US)

(72) Inventors: Qing Cao, Yorktown Heights, NY (US); Kangguo Cheng, Schenectady, NY (US); Zhengwen Li, Scarsdale, NY (US); Fei Liu, Yorktown Heights, NY (US); Zhen Zhang, Ossining, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 143 days.

(21) Appl. No.: 13/868,654

(22) Filed: Apr. 23, 2013

(65) Prior Publication Data
US 2014/0312249 A1    Oct. 23, 2014

(51) Int. Cl.
G01T 1/02    (2006.01)
G01T 1/06    (2006.01)

(52) U.S. Cl.
CPC ........................................ G01T 1/06 (2013.01)

(58) Field of Classification Search
CPC .......................................................... G01T 1/06
See application file for complete search history.

(56) References Cited

U.S. PATENT DOCUMENTS

| | | | |
|---|---|---|---|
| 4,189,639 A * | 2/1980 | Kai et al. | 250/282 |
| 6,955,639 B2 | 10/2005 | Hainfeld et al. | |
| 6,984,265 B1 | 1/2006 | Raguse et al. | |
| 7,476,889 B2 | 1/2009 | DeMeo et al. | |
| 7,998,239 B1 | 8/2011 | Nenoff et al. | |
| 2009/0047512 A1 | 2/2009 | Conroy | |
| 2010/0247899 A1 | 9/2010 | Shih et al. | |
| 2011/0003279 A1 | 1/2011 | Patel | |
| 2011/0081724 A1* | 4/2011 | Swager et al. | 436/57 |

FOREIGN PATENT DOCUMENTS

CN        1554503 A  *  12/2004

OTHER PUBLICATIONS

Machine translations of the Abstract, Description, and Claims of CN 1554503 A (3 documents downloaded Nov. 6, 2014).*

Alqathami, M., et al., "Novel Multicompartment 3-Dimensional Radiochromic Radiation Dosimeters for Nanoparticle-Enhanced Radiation Therapy Dosimetry" International Journal of Radiation Oncology*Biology*Physics, vol. 84, Issue 4. Nov. 2012. pp. e549-e555.

Liu, J. et al., "A Colorimetric Lead Biosensor Using Dnazyme-Directed Assembly of Gold Nanoparticles" Journal of the American Chemical Society, vol. 125, No. 22. May 2003. pp. 6642-6643.

Lusvardi, G., et al., "Bioactive Glasses Containing Au Nanoparticles. Effect of Calcination Temperature on Structure, Morphology, and Surface Properties" Langmuir, vol. 26, No. 12. Apr. 2010. pp. 10303-10314.

(Continued)

Primary Examiner — Constantine Hannaher
(74) Attorney, Agent, or Firm — Tutunjian & Bitetto, P.C.; Vazken Alexanian

(57) ABSTRACT

A method for colorimetric radiation dosimetry includes subjecting an aggregate including a polymeric matrix having uniformly dispersed nanoparticles therein to radiation. The aggregate is soaked in a solution selected to dissolve decomposed pieces of the polymeric matrix to release into the solution nanoparticles from the decomposed pieces. Color of the solution is compared to a reference to determine a dose of radiation based on number of liberated nanoparticles.

16 Claims, 5 Drawing Sheets

(56) References Cited

OTHER PUBLICATIONS

Marques, T., et al., "Gel Dosimetry Analysis of Gold Nanoparticle Application in Kilovoltage Radiation Therapy" Journal of Physics: Conference Series, vol. 250. Aug. 2010. (5 pages).

Rahman, W.T., et al., "Polymer Gels Impregnated With Gold Nanoparticles Implemented for Measurements of Radiation Dose Enhancement in Synchrotron and Conventional Radiotherapy Type Beams" Australasian Physical & Engineering Sciences in Medicine, vol. 35, Issue 3. Sep. 2012. pp. 301-309.

Wang, Z., et al., "Gold Nanoparticle Probes" Coordination Chemistry Reviews, vol. 253, No. 11. Jun. 2009. pp. 1607-1618.

* cited by examiner

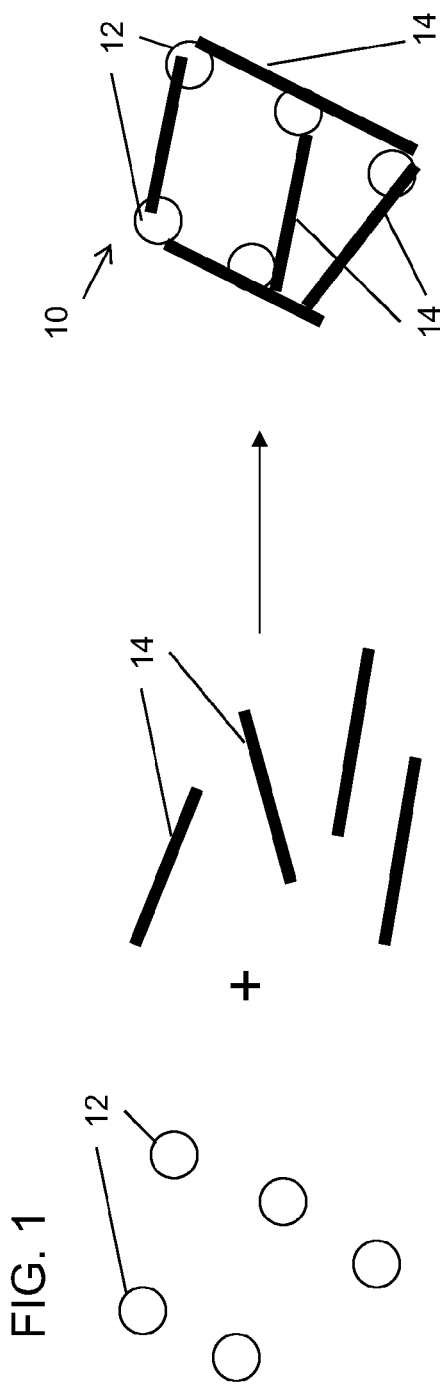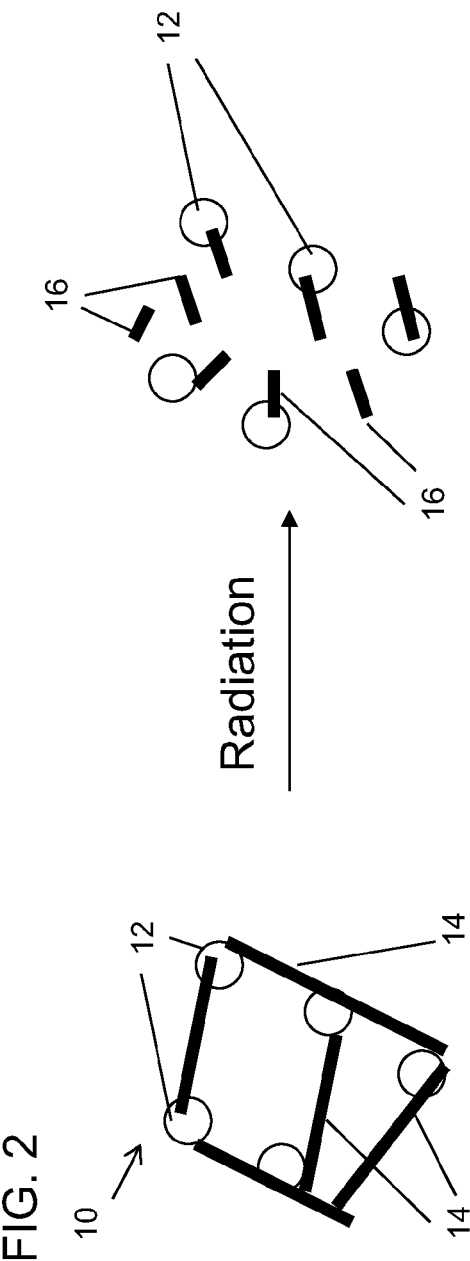

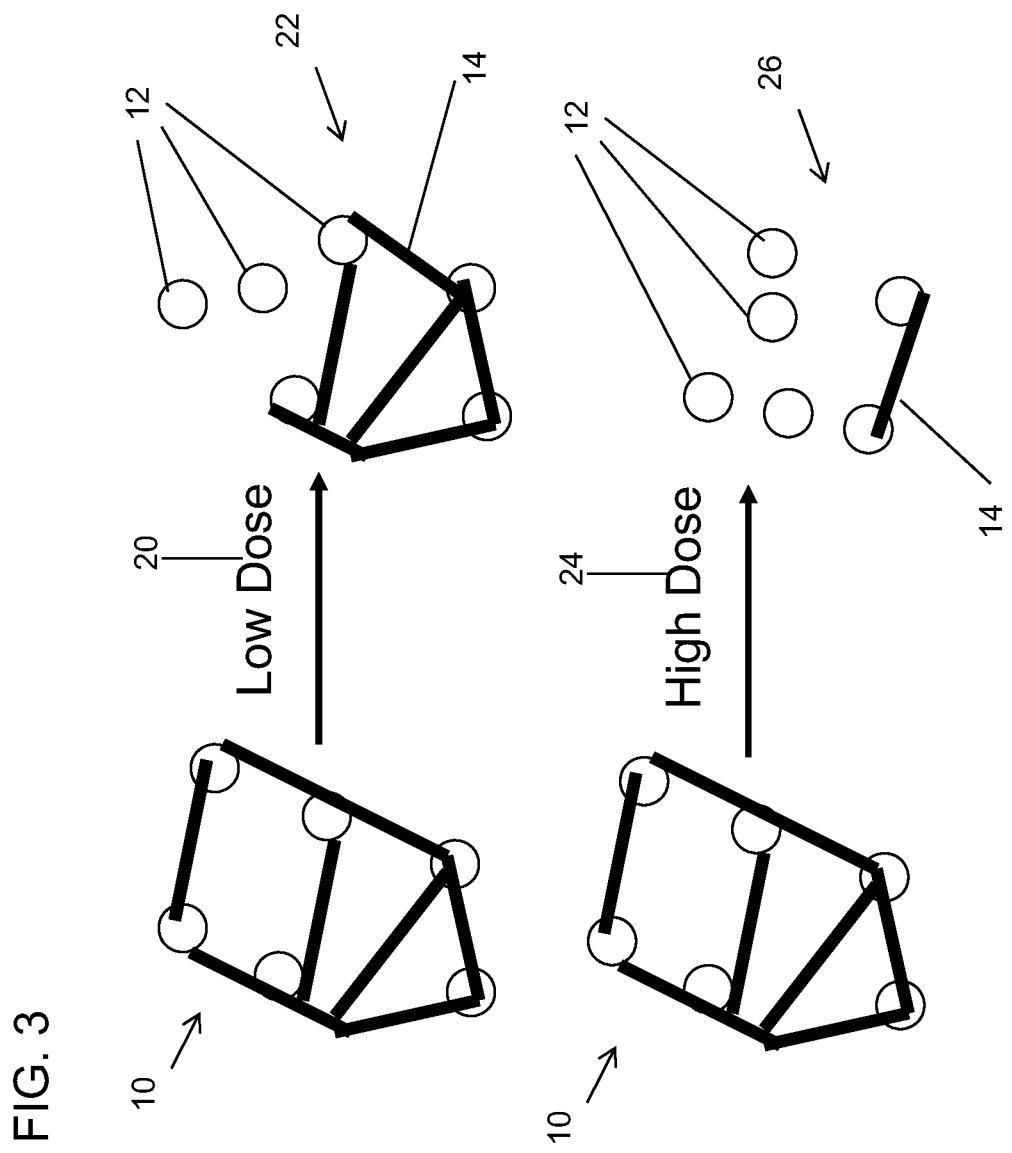

US 9,057,787 B2

COLORIMETRIC RADIATION DOSIMETRY BASED ON FUNCTIONAL POLYMER AND NANOPARTICLE HYBRID

BACKGROUND

1. Technical Field

The present invention relates to dosimetry, and more particularly to a composition, device and method for measuring radiation using change of color of a compound before and after exposure to radiation.

2. Description of the Related Art

Radiation dosimetry is the measurement and calculation of the radiation dose in matter and tissue resulting from the exposure to indirect and direct ionizing radiation. Dosimetry has application in many fields including medical or health physics, security scanning, radiation exposure occupations (e.g., nuclear plant workers), etc. Low-cost and fast dosimetry is particularly important for various applications ranging from homeland security to personal health monitoring. Current methods tend to be either very expensive or provide results that are difficult to read.

SUMMARY

A method for colorimetric radiation dosimetry includes subjecting an aggregate including a polymeric matrix having uniformly dispersed nanoparticles therein to radiation. The aggregate is soaked in a solution selected to dissolve decomposed pieces of the polymeric matrix to release into the solution nanoparticles from the decomposed pieces. Color of the solution is compared to a reference to determine a dose of radiation based on number of liberated nanoparticles.

Another method for colorimetric radiation dosimetry includes forming an aggregate material including a polymeric matrix having uniformly dispersed nanoparticles therein; subjecting the aggregate material to radiation or a potential radiation source; soaking the aggregate material in a solution selected to dissolve decomposed pieces of the polymeric matrix to release into the solution nanoparticles from the decomposed pieces; and comparing color of the solution to a reference to determine a dose of radiation based on number of liberated nanoparticles.

A system for colorimetric radiation dosimetry includes an aggregate including a polymeric matrix having uniformly dispersed nanoparticles therein to be subjected to radiation or a potential radiation source. A solution for soaking the aggregate is selected to dissolve decomposed pieces of the polymeric matrix to release into the solution, liberated nanoparticles from the decomposed pieces. A color comparison device is configured to measure color of the solution with liberated nanoparticles and compare the color to a reference to determine a dose of radiation based on the number of the liberated nanoparticles.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 1 is a conceptual diagram illustratively showing formation of an aggregate of nanoparticles and radiation sensitive polymers in accordance with the present principles;

FIG. 2 is a conceptual diagram illustratively showing a decomposition of the radiation sensitive polymers to liberate the nanoparticles after radiation in accordance with the present principles;

FIG. 3 is a conceptual diagram illustratively showing low dose and high dose decompositions of the radiation sensitive polymers to liberate the nanoparticles after different amounts of radiation in accordance with the present principles;

DETAILED DESCRIPTION OF PREFERRED EMBODIMENTS

Figure 4:
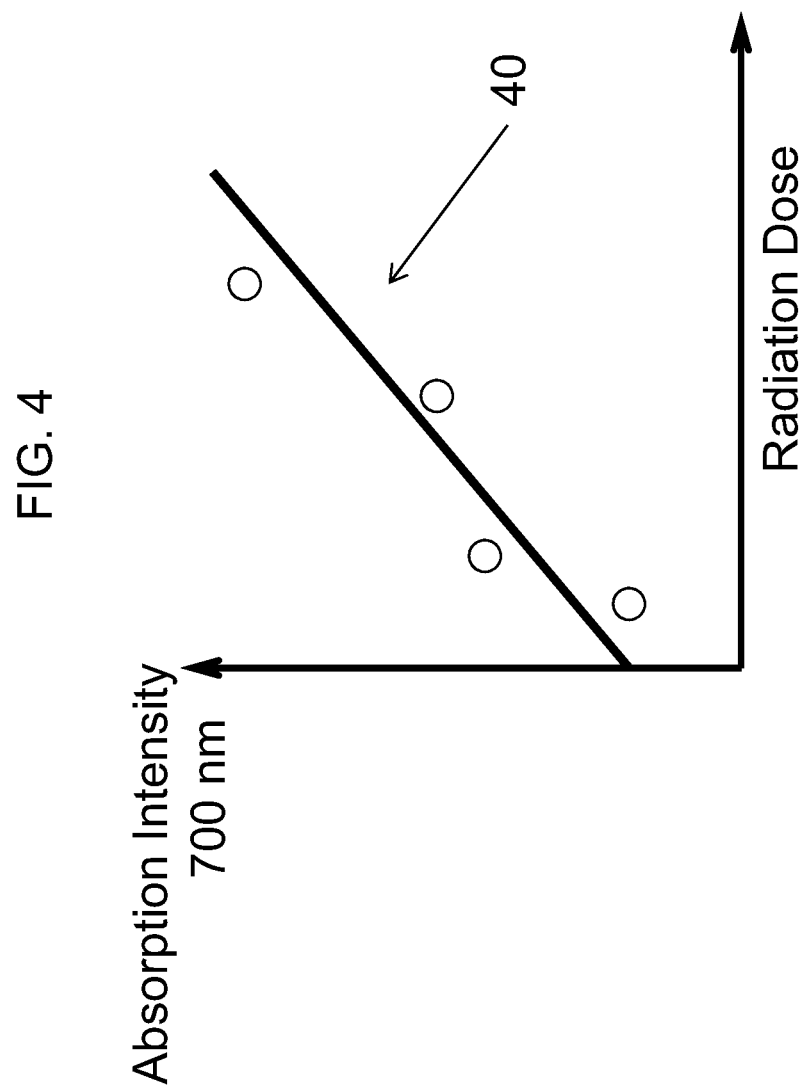
FIG. 4 is an illustrative plot of absorption intensity at a certain wavelength, e.g. 700 nm, versus radiation dose, in accordance with the present principles.

In accordance with the present principles, a film composition is provided that is sensitive and affected by radiation exposure. When soaked in a solvent, degradation of the composition structure causes the solvent to acquire free nanoparticles producing a color, or more precisely the optical absorption at a specific wavelength, that is directly proportional to the amount of degradation and therefore the amount of radiation exposure. The color changes can be instantaneously determined. The fabrication and processing of the composition is relatively low in cost and provides immediate results addressing some of the disadvantages of conventional techniques.

In one embodiment, metal nanoparticles (e.g., gold nanoparticles) or quantum dots are uniformly dispersed in a polymer matrix to form a hybrid or aggregate material. The polymer matrix is a functional polymer, which serves as a sensitizer under radiation. A degree of decomposition is directly related with dose of radiation exposure. The hybrid material is soaked in a solvent that can only dissolve monomers or small oligomers, e.g., isopropyl alcohol (IPA) for decomposed poly methyl methacrylate (PMMA). Released nanoparticles will change the color of the solvent. The dose of radiation received can be directly read out via colorimetric matching against a reference or by measuring the absorption, of the nanoparticle solution. For example, the concentration of free and aggregated gold nanoparticles can be measured with UV-Vis absorption at 522 nm and 700 nm, respectively. Certain polymers can decompose under radiation. For example, PMMA under β radiation and poly(olefin sulfones) under γ radiation. The present principles provide a simple and cost effective way to detect radiation doses.

It is to be understood that the present invention will be described in terms of a given illustrative structure; however, other structures, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a conceptual diagram shows the synthesis of a polymeric hybrid material or aggregate 10 including metal nanoparticles or quantum dots 12 (referred to collectively hereinafter as nanoparticles) and a radiation sensitive polymer 14 in accordance with one embodiment. To form the aggregate 10, nanoparticles 12 are introduced to the polymer matrix during fabrication of the polymer matrix. In a particularly useful embodiment, the radiation sensitive polymer 14 may include PMMA, poly(olefin sulfone)s, diselenide block copolymers, polytetrafluoroethylene, etc. The nanoparticles 12 may include Au nanoparticles (in the size range of about 5~500 nm) and/or quantum dots (e.g., CdSe, CdTe, and PdS, in the size range of about 1~10 nm).

PMMA may be produced by emulsion polymerization, solution polymerization, or bulk polymerization. Generally, radical initiation is used (including living polymerization methods), but anionic polymerization of PMMA can also be performed. PMMA produced by radical polymerization is atactic and completely amorphous. The structure of the polymer 14 with a uniform density of nanoparticles 12 can be formed by several approaches. In one approach, the nanoparticles can be directly mixed with the PMMA polymer matrix after synthesis. The PMMA matrix is first thiol-functionalized at a level of 1~10%. These thiol-functional groups bind with nanoparticles (e.g., gold) and therefore enable a uniform distribution by minimizing the formation of nanoparticle agglomerates.

In another approach, a $HAuCl_4$ precursor with different concentrations can be mixed with PMMA in acetone. Applying the mixture onto a substrate via techniques such as spin coating, dip-coating, or slit casting forms a film with controllable thickness. UV light irradiation implements the photoreduction of gold ions and ensures formation of gold nanoparticles uniformly in the polymer matrix. In both approaches, the nanoparticle range can be adjusted from a low, e.g., 0.001% wt, to high, e.g., 1% wt., to fit different targeted dynamic ranges of the dosimeter.

The aggregate 10 includes a solid form. The solid form may be molded into shapes suitable for different applications. In one embodiment, a thin film may be employed and may be molded as a rectangular shape and placed with a film badge, or other holder to secure the film.

PMMA is an organic glass at room temperature; i.e., it is below its glass transition temperature ($T_g$). The forming temperature is at or greater than the glass transition temperature. A molding process may be employed to shape the PMMA using, e.g., injection molding, compression molding, and extrusion. Quality PMMA sheets may be fabricated by cell casting, where the polymerization and molding steps occur concurrently.

PMMA may be shaped by mechanical processing after its formation. In one embodiment, laser cutting may be used to form intricate designs from PMMA sheets. In one embodiment, methyl methacrylate "synthetic resin" for casting (simply the bulk liquid chemical) may be used in conjunction with a polymerization catalyst such as MEKP, to produce hardened transparent PMMA in any shape, from a mold. In accordance with the present principles, nanoparticles 12 may be mixed into the solution prior to polymerization. Coatings or additives may be introduced on or in the PMMA to improve absorption or other purposes. PMMA monomers/oligomers dissolves in many organic solvents, e.g., IPA or the like. Modified formulations with varying amounts of other co-monomers, additives, and fillers may be created for uses where specific properties are needed.

Referring to FIG. 2, a conceptual diagram shows use of the aggregate 10 and its reaction to radiation in accordance with one embodiment. The aggregate 10 is exposed to radiation that decomposes the polymer to form decomposed parts 16, e.g., oligomers, monomers, etc. and releases the nanoparticles 12. The degree of decomposition is directly related to the dose or radiation and therefore is directly related to a number of nanoparticles 12 released from the aggregate 10.

Referring to FIG. 3, conceptual diagrams illustratively show a difference between the aggregate 10 subjected to a low dose of radiation 20 to provide a structure 22 having a lower number of released nanoparticles 12 than that of the aggregate 10 after a high dose of radiation 24 to provide a structure 26 having a higher number of released nanoparticles 12.

After exposure or after a known duration of time, the aggregate 10 is soaked in a solvent configured or selected to dissolve only the monomers or small oligomers. In this way, the main polymeric structure remains intact and nanoparticles not released by decomposition remain bound in the main polymeric structure. The solvent may include isopropyl alcohol although other solvents, such as water, may be employed.

With the dissolving of the monomers and the oligomers, the nanoparticles 12 change the color of the solvent. The color is proportional to the number of nanoparticles in solution, with a specific volume of the aggregate 10 and the solvent used. Therefore, the dose of radiation received by the aggregate 10 can be directly read out by colorimetric matching against a reference or by measuring absorption spectra of the solution.

Referring to FIG. 4, an illustrative graph 40 shows absorption intensity (at 700 nm) versus radiation dose. Once the solution with nanoparticles is obtained, absorption intensity is measured and compared on the graph to obtain the radiation dose.

Figure 5:
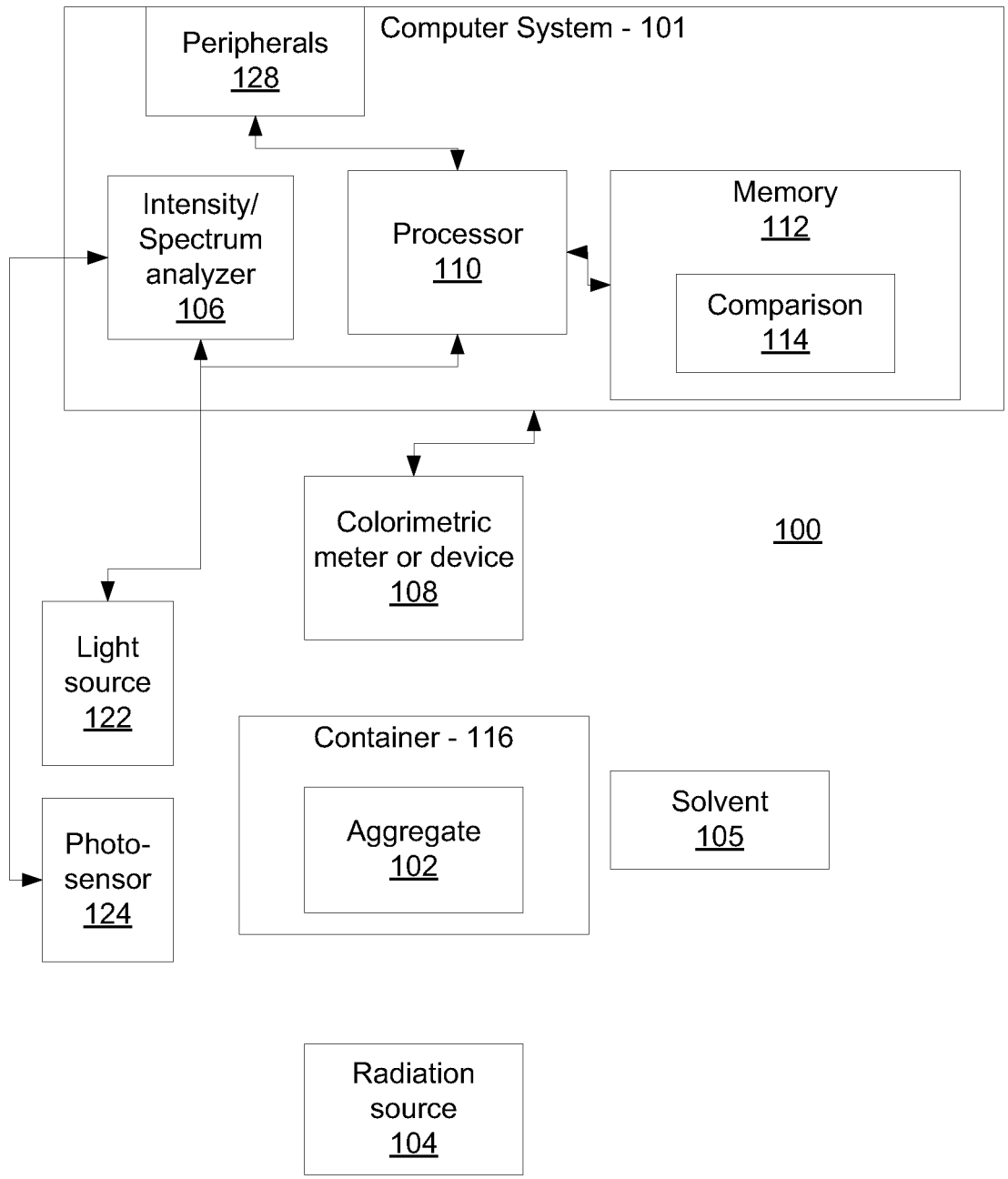
FIG. 5 is a block/flow diagram showing a system/method for colorimetric radiation dosimetry in accordance with one illustrative embodiment.

Referring to FIG. 5, a system 100 for colorimetric radiation dosimetry is shown in accordance with the present principles. An aggregate 102 is provided in a container 116 which partially encloses the aggregate 102. The aggregate 102 may include PMMA under β radiation, poly(olefin sulfone) under γ radiation, etc. Other materials may be employed for these or other types of radiation. The aggregate 102 may be shaped or formed into an article of clothing, a badge, a plate or any other useful shape to measure the radiation exposure of a person or device. The aggregate 102 may be formed in the container 116 or placed in the container after exposure to radiation. The aggregate 102 may include patches or sections of different materials to provide measurement of two or more radiation types.

A radiation source 104 may include a random source or a source employed for medical or security imaging or screening. The radiation source 104 may be part of another piece of equipment such as a medical device or the like. In use, the aggregate 102 is exposed to the radiation source 104. This may include intentional exposure or incidental exposure. In the case of incidental exposure, the aggregate 102 is processed after a predetermined amount of time.

If and when the aggregate 102 is exposed to radiation, the aggregate 102 is soaked with a solvent 105, which may include water, an alcohol or other hydrocarbon solvent. The solvent 105 may be introduced to the container 116 to soak the aggregate 102. The container 116 may include heaters, vibrational mechanisms, etc. to enhance dissolution of monomers or oligomers in solution and enhance the release of nanoparticles into the solution.

The nanoparticles in solution change the color of the solution and indicate an amount or dose of radiation to the aggregate 102. In one embodiment, the color of the solution is compared to a chart, card or other reference as a colorimetric device 108. If a chart, card or other reference is employed, a user may directly compare the color of the solution to the chart or card to perform a visual comparison. In another embodiment, the colorimetric device 108 may include an electronic device that includes a photosensor that can measure the properties of the solution and compare the properties to a reference, e.g., stored in a comparison module 114 in a memory 112.

In another embodiment, light from a light source 122 is employed to illuminate the solution at predetermined wavelengths. A photosensor 124 receives the reflected light and analyzes the reflected light to determine absorption spectra of the solution. In one embodiment, the concentration of free and aggregated gold nanoparticles can be measured with UV-Vis absorption, e.g., respectively at 522 nm and 700 nm. The absorption spectra can be compared in the comparison module to reference graphs or data and output an exposure dosage.

System 100 may include a computer or computer-like device 101 configured with a processor 110 and memory 112 to carry out a comparison for colorimetric dosimetry. Peripheral devices 128 may include a keyboard, a mouse, a printer, a display, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
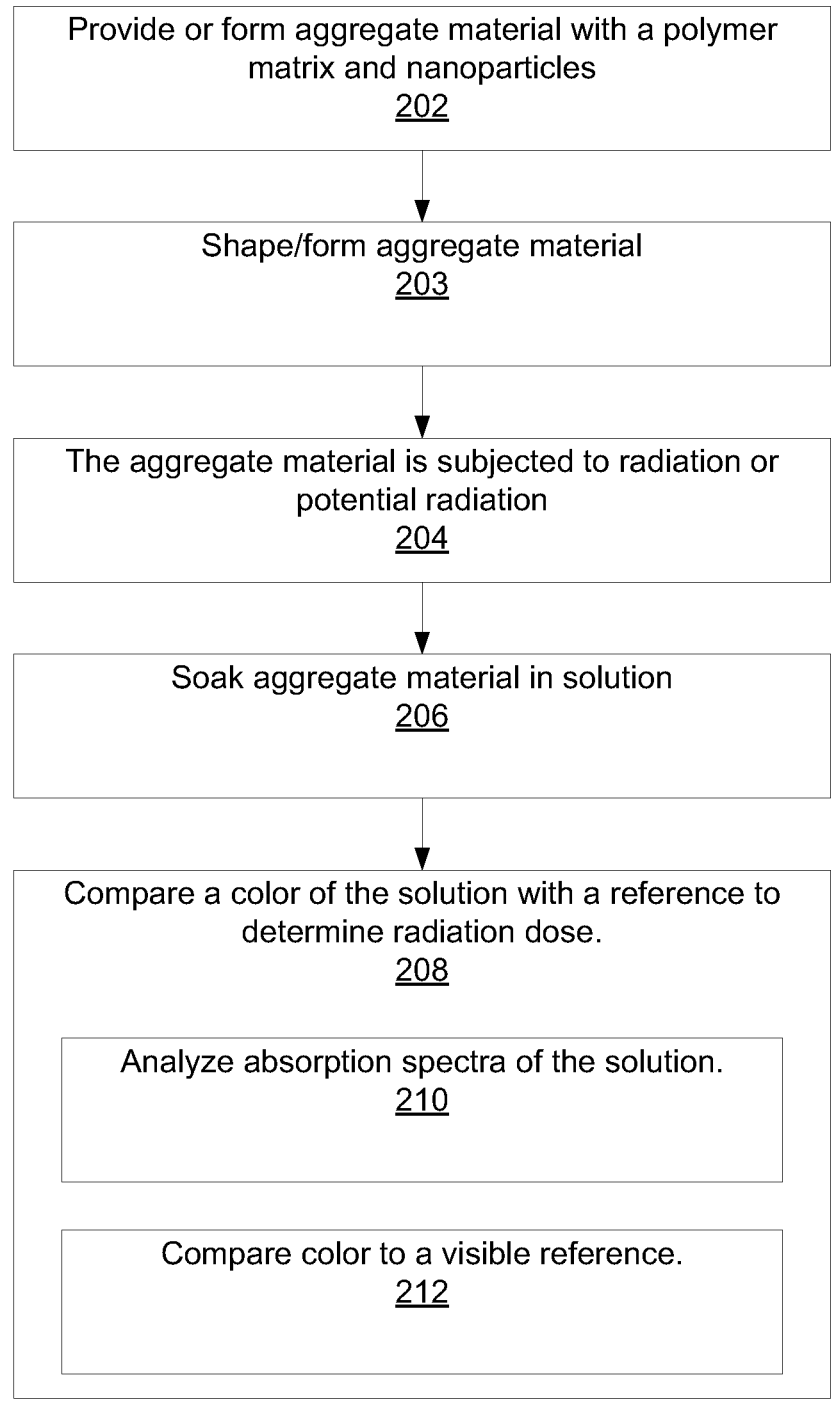
FIG. 6 is a block/flow diagram showing a system/method for colorimetric radiation dosimetry in accordance with another illustrative embodiment.

Referring to FIG. 6, a method for colorimetric radiation dosimetry is shown in accordance with illustrative embodiments. In block 202, an aggregate material including a polymeric matrix having uniformly dispersed nanoparticles therein is formed or provided. The polymeric matrix may include at least one of: polymethyl methacrylate (to measure beta radiation) and poly (olefin sulfones) (to measure gamma radiation), etc. The nanoparticles may include gold nanoparticles and/or quantum dots. In block 203, the aggregate material may be shaped into or more of an article of clothing, a shaped three-dimensional object and a film on an object. In addition, patches of different aggregate materials may be employed to measure different radiation types.

In block 204, the aggregate material is subjected to radiation or a potential radiation source. In block 206, the aggregate material is soaked in a solution (solvent). The solution is selected and configured to dissolve decomposed pieces of the polymeric matrix without further decomposing the polymeric matrix to release into the solution, liberated nanoparticles from the decomposed aggregate. In one embodiment, the solution includes in alcohol solution. In another embodiment, water may be employed.

In block 208, a color of the solution is compared to a reference to determine a dose of radiation based on a number of liberated nanoparticles. In block 210, comparing the color includes analyzing absorption spectra (e.g., at a wavelengths of 522 nanometers for free for gold nanoparticles and 700 nanometers for aggregated gold nanoparticles) of the solution with the liberated nanoparticles. In block 212, comparing the color may include comparing the color to a visual reference to determine radiation dose.

Having described preferred embodiments colorimetric radiation dosimetry based on functional polymer and nanoparticle hybrid (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for colorimetric radiation dosimetry, comprising:
    subjecting an aggregate including a polymeric matrix having uniformly dispersed nanoparticles therein to radiation;
    soaking the aggregate in a solution selected to dissolve decomposed pieces of the polymeric matrix to release into the solution nanoparticles from the decomposed pieces; and
    comparing color of the solution to a reference to determine a dose of radiation based on number of liberated nanoparticles from said uniformly dispersed nanoparticles that were released from the polymeric matrix of the aggregate into the solution, when the aggregate was said soaking in the solution.

2. The method as recited in claim 1, wherein the polymeric matrix includes polymethyl methacrylate and a radiation type to be measured includes beta radiation.

3. The method as recited in claim 1, wherein the polymeric matrix includes poly (olefin sulfones) and a radiation type to be measured includes gamma radiation.

4. The method as recited in claim 1, wherein the nanoparticles include at least one of gold nanoparticles and quantum nanodots.

5. The method as recited in claim 1, wherein soaking the aggregate in the solution includes soaking the aggregate in alcohol solution.

6. The method as recited in claim 1, wherein comparing the color includes analyzing absorption spectra of the solution with the liberated nanoparticles.

7. The method as recited in claim 6, wherein analyzing absorption spectra includes measuring absorption spectra at wavelengths of at least one of 522 nanometers and 700 nanometers for gold nanoparticles.

8. The method as recited in claim 1, wherein comparing the color includes comparing the color to a visual reference to determine radiation dose.

9. A method for colorimetric radiation dosimetry, comprising:
    forming an aggregate material including a polymeric matrix having uniformly dispersed nanoparticles therein;
    subjecting the aggregate material to radiation or a potential radiation source;
    soaking the aggregate material in a solution selected to dissolve decomposed pieces of the polymeric matrix to release into the solution nanoparticles from the decomposed pieces; and
    comparing color of the solution to a reference to determine a dose of radiation based on number of liberated nanoparticles from said uniformly dispersed nanoparticles that were released from the polymeric matrix of the aggregate into the solution, when the aggregate was said soaking in the solution.

10. The method as recited in claim 9, wherein the polymeric matrix includes at least one of: polymethyl methacrylate and a radiation type to be measured includes beta radiation; and poly (olefin sulfones) and the radiation type to be measured includes gamma radiation.

11. The method as recited in claim 9, wherein forming the aggregate material includes employing a $HAuCl_4$ precursor mixed with the polymer material in acetone to provide gold nanoparticles in the aggregate material.

12. The method as recited in claim 9, wherein soaking the aggregate in the solution includes soaking the aggregate in alcohol solution.

13. The method as recited in claim 9, wherein comparing the color includes analyzing absorption spectra of the solution with the liberated nanoparticles.

14. The method as recited in claim 13, wherein analyzing absorption spectra includes measuring absorption spectra at wavelengths of at least one of 522 nanometers and 700 nanometers for gold nanoparticles.

15. The method as recited in claim 9, wherein comparing the color includes comparing the color to a visual reference to determine radiation dose.

16. The method as recited in claim 9, wherein forming the aggregate material includes shaping the aggregate material into one or more of an article of clothing, a shaped three-dimensional object and a film on an object.

\* \* \* \* \*